United States Patent [19]
Yamada et al.

[11] Patent Number: 5,595,838
[45] Date of Patent: Jan. 21, 1997

[54] METHOD FOR MANUFACTURING CARBON COMPOSITE ELECTRODE MATERIAL

[75] Inventors: Kazuo Yamada, Nara-ken; Hideaki Tanaka, Nara; Takehito Mitate; Masaharu Yoshikawa, both of Nara-ken, all of Japan

[73] Assignee: Sharp Kabushiki Kaisha, Osaka, Japan

[21] Appl. No.: 323,572

[22] Filed: Oct. 17, 1994

Related U.S. Application Data

[63] Continuation of Ser. No. 13,029, Feb. 3, 1993, abandoned.

[30] Foreign Application Priority Data

Feb. 4, 1992 [JP] Japan ..................... 4-017969

[51] Int. Cl.⁶ .................................. C25B 11/04
[52] U.S. Cl. .................. 429/209; 427/113; 427/122
[58] Field of Search .................... 427/113, 122, 427/123, 126.1, 402; 429/209

[56] References Cited

U.S. PATENT DOCUMENTS 4,968,527  11/1990  Yoshimoto et al. .................. 427/122

FOREIGN PATENT DOCUMENTS

| | | |
|---|---|---|
| 0239410 | 9/1987 | European Pat. Off. . |
| 0334501 | 9/1989 | European Pat. Off. . |
| 0346088 | 12/1989 | European Pat. Off. . |
| 0419090 | 3/1991 | European Pat. Off. . |

*Primary Examiner*—Glenn A. Caldarola
*Attorney, Agent, or Firm*—David G. Conlin; George W. Neuner

[57] ABSTRACT

A method for manufacturing a carbon composite electrode material which comprises coating the surface of core carbon particles with high crystallinity with a film containing a element of Group VIII metal and depositing and/or covering the surface of resulting coated carbon particles with a carbon material to be formed upon pyrolysis of a hydrocarbon or its derivative.

21 Claims, 2 Drawing Sheets

METHOD FOR MANUFACTURING CARBON COMPOSITE ELECTRODE MATERIAL

This is a continuation of application Ser. No. 08/013,029 filed on Feb. 3, 1993, abandoned.

BACKGROUND OF THE INVENTION

1. Field of the invention

The present invention relates to a method for manufacturing a carbon composite material. More particularly, it relates to a method for manufacturing a carbon composite electrode material used as a negative electrode active material in lithium secondary batteries.

2. Description of the Related Art

It was reported that when a certain type of carbon material, of carbon composite electrode materials, is used as a negative electrode active material in lithium secondary batteries, the charge-discharge cycle characteristic and safety of the secondary batteries is excellent (for example, Japanese Patent Unexamined Publication Nos. Sho 63-24555 and Hei 1-311565). This carbon material is manufactured, for example, by chemical vapor deposition (CVD) of a hydrocarbon.

The inventors of this application found out and disclosed the fact that outstandingly excellent as the negative electrode active material in lithium secondary batteries was particularly a carbon material of a structure such that its internal layer had high crystallinity and that its surface layer was coated with a carbon having a turbulent layer structure (Japanese Patent Application No. Hei 3-144547).

As manufacturing methods of carbon composite electrode materials, there is available a method of forming and depositing a carbon material through chemical vapor depositon any hydrocarbon or its derivatives on the surface of such a carbon material as graphite used as its core material. In this instance, the deposited carbon material shows a turbulent layer structure. The system needs to be held at about 1000° C. for a long period of time so to deposit the carbon material having such a turbulent layer structure. Under such conditions, this method is not practically useful, because a large amount of a tarry product is generated by side reactions.

SUMMARY OF THE INVENTION

The present invention provides a method for manufacturing a carbon composite electrode material which comprises coating the surface of core carbon particles with high crystallinity with a film containing a element of Group VIII metal and depositing and/or covering the surface of resulting coated carbon particles with a carbon material to be formed upon pyrolysis of a hydrocarbon or its derivative.

Desirable carbon material should be formed by pyrolysis in vapor phase or aerosol state of any hydrocarbon or its derivatives and the crystal structure of the carbon particles are consisted of a mean interlayer spacing of approx. 0.335–0.340 nm in the C-axis direction and a ratio of intensity of lower than about 0.4 at 1360 $cm^{-1}$ to that at 1580 $cm^{-1}$ of the argon laser Raman spectra method.

Further, the element of Group VIII metal should desirably be nickel, cobalt or iron or their alloys and the thickness of the film containing the element 0.1–2.0 μm.

Furthermore, the carbon composite electrode material is desirable to be employed as a negative electrode active material in lithium secondary batteries.

DETAILED DESCRIPTION OF THE INVENTION

Figure 1:
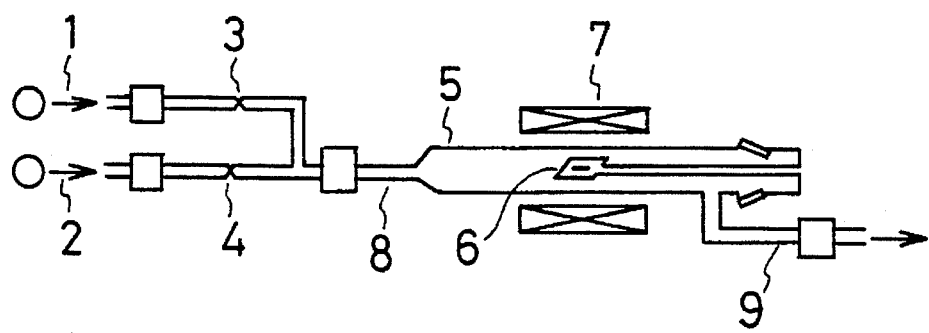
FIG. 1 is a schematic diagram of a carbon material pyrolysis and depositing apparatus used in an embodiment of this invention.

The present invention provides a method for manufacturing carbon composite electrode material which is coated by carbon material on the surface of the core carbon particles with high crystallinity, relatively a low temperature, in a short time and in order to increase the specific surface area of the carbon composite.

The core carbon particles with high cristallinity of the present invention are natural graphite, kish graphite, or carbons obtained by heat treating at such a high temperature as above 2000° C. such a well-known carbon material as petroleum coke or coal pitch coke or the like graphitizing carbons. Their mean particle size should desirably be not larger than 100 μm, particularly about 1–20 μm. If its particle size falls in this range, its utilization rate as an active material is high and the filling density of the negative electrode active material may be made high. The mean particle size is given by measuring and averaging the particle sizes distributed per unit volume as determined by laser diffraction particles analyzer.

Its form may include either spherical, flaky crystal or fibrous or their pulverulences, but the spherical or flasky crystal form is preferable.

Further, its desirable crystal structure should have a mean interlayer spacing of 0.335–0.340 nm, as determined by the X-ray wide angle diffraction method, and lower than about 0.4 as a ratio of the peak intensity at 1360 $cm^{-1}$ to that at 1580 $cm^{-1}$ in the argon laser Raman scattering method. The core carbon particles with high crystallinity of the present invention are coated with a film containing a Group VIII metal. The elements of Group VIII metal of the present invention include iron, nickel, cobalt, ruthenium, rhodium, paradium, osmium, iridium and platinum and their alloys. Among them, iron, nickel and cobalt are preferable.

The coating methods include electroless plating process or a vapor deposition process of evaporating by heating the aforementioned Group VIII metal held under a highly reduced pressure, and sputtering process to form a metal film by the ion impact, and so on. The electroplating process or the electroless plating process is preferable in views of economy and productivity.

In the electroless nickel plating process, a plating bath is prepared with approx. 20 of $NiSO_4 \cdot 7H_2O$ and approx. 25 of $NAH_2PO_2$ in ratio by weight with its pH adjusted to approx. 5.0 and the core carbon particles are dipped into this plating bath. Then by adding such a reducing agent as phosphate or sodium hydrogen boride to this plating bath, while holding it at about 90° C., a metal film is formed on the surface of the carbon particles with high crystallinity. For these plating baths and the reducing agents, those prepared and available on the commercial may be utilized (for example, TMP Kagaku nickel: mfd. by Okuno Seiyaku Kogyo K.K.).

The average thickness of the coated film containing a Group VIII metal should preferably be 0.01–2.0 μm. If it is thinner than 0.01 μm, its effect as a catalyst is slight, but if thicker than 2.0 μm, the rates of intercalation and deintercalation into and from the internal carbon material are slow and high crystal structure of the internal carbon material becomes useless for intercalation and deintercalation.

As the film containing a Group VIII metal, a carbon material is formed, deposited and/or covered through pyrolysis of a hydrocarbon or its derivatives in vapor phase or in the state of aerosol. The hydrocarbons and their derivatives include aliphatic or aromatic or alicyclic hydrocarbons and their partly substituents (halogen atoms, hydroxyl, sulfo, nitro, amino and carboxyl groups, etc.). Their actual examples include: methane, ethane, propane, butane, pentane, hexane, cyclohexane, naphthalene, anthracene, pyrene, benzene, toluene, pyridine, allyl benzene, hexamethyl benzene, aniline, phenol, 1,2-dichloroethylene, 1,2-dibromoethylene, 2-butene, acetylene, biphenyl, diphenyl acetylene, styrene, acrylonitrile, pyrrole and thiophene and their derivatives. Of these compounds, methane, ethane and propane are preferable, because they are not expensive, their waste gases are readily treatable and they are not liable to corrode the pyrolysis furnace.

Any of the aforementioned hydrocarbons or its derivatives it gas phase or in aerosol state is (are) fed to a carbon pyrolysis and depositing apparatus, to be carried onto a film containing a Group VIII metal which is placed on a holder for depositing carbon material. As the reaction conditions at that time, the feed rate of the gas phase material or the aerosol is 0.03–20 mols/hr and its flow rate 5–100 cm/min. This pyrolysis is performed at a temperature of approx. 300°–1300° C., preferably approx. 500°–1100° C. in a noncombustible atmosphere, for example, under reduced pressure or in an inert gas. In this way, a carbon composite electrode material with a particle size of approx. 15–50 μm is obtained.

In this carbon composite electrode material, core carbon particles with high crystallinity are coated with a film containing a Group VIII metal and on their film surface, there is further formed a carbon material through pyrolysis and depositing of a hydrocarbon or its derivatives in gas phase or in the aerosol. Accordingly, it has the undermentioned characteristic features.

First, since the Group VIII metal acts as a catalyst for the pyrolysis reaction of the hydrocarbon or its derivatives in gas phase or in aerosol state, the carbon material can be relatively formed and deposited at a low temperature and in a short time.

Secondly, a part or all film of the Group VIII metal diffuses into the carbon material formed, deposited and/or covered thereon during the aforementioned pyrolysis, the core carbon particles with high crystallinity are directly covered with the carbon material formed and deposited through pyrolysis.

Thirdly, the carbon material of the surface layer of the carbon composite electrode material is a carbon material formed and deposited through pyrolysis of a hydrocarbon. Therefore, it is a carbon material of the so-called turbulent layer structure which permits easy intercalation and deintercalation of lithium ion, etc. The carbon material with turbulent layer structure refers to a material having a crystal structure which gives a mean lattice width of 0.337 nm or larger in its C-axis direction and which gives a ratio of 0.4 or higher of the peak intensity at 1360 cm$^{-1}$ to that at 1580 cm$^{-1}$ of the argon laser Raman spectra.

EXAMPLES

Example 1

As core carbon particles with high crystallinity, 5.014 g of a powder (mean particle size 18.0 μm, average lattice width of 0.3358 nm in the C-axis direction and the peak at 1360 cm$^{-1}$ in its argon laser Raman spectra not observed) of graphite (KS-75, mfd. by Lonza Co.) were taken and coated with nickel by the electroless nickel plating process. In forming the nickel film, the powder was subjected to a sensitization treatment as a pretreatment, using MAC-100 (mfd. by Okuno Seiyaku Kogyo K.K.), thoroughly water-rinsed, then subjected to an activation treatment with MAC-200 (mfd. by Okuno Seiyaku Kogyo K.K.), followed by thorough water-rinsing, and thereafter underwent the plating process. The film was formed using TMP Kagaku nickel (mfd. by Okuno Seiyaku Kogyo K.K.) as the plating bath at approx. 35° C., while stirring the bath with a stirrer.

Since the weight of graphite, after coated with the film, was 10.128 g, the mean nickel film thickness was calculated to be 0.79 μm from the increment of its weight and its mean particle size.

The graphite coated with nickel film obtained in this way was mounted on a holder of a carbon pyrolysis and depositing apparatus. Then using the carbon pyrolysis and depositing apparatus shown in FIG. 1, the formation, deposition and/or covering of the carbon material through pyrolysis of any hydrocarbon was carried out by the undermentioned procedure.

Through an argon feeding line 1 and a propane feeding line 2, argon and propane gases were respectively fed into this apparatus. By operating needle valves 3 and 4, the concentration of propane was adjusted to 10 mol %. The current velocity of both gases was preset to 12.7 cm/min and propane was fed at a rate of 0.05 mol/hr. On the other hand, on the sample holder 6 inside the reactor tube 5, the graphite coated with the nickel film was mounted and a furnace was installed on the outer circumference of the reactor tube 5. By this furnace 7, the sample holder 6 and the graphite coated with the nickel film were held at a temperature of 750° C., to pyrolysis of the propane fed through a pipe 3 made of Pyrex glass, thereby forming and depositing the carbon material on the surface of the nickel film costing the graphite, yielding particles of a carbon composite electrode material. The reaction time at this time was set at approx. 30 min. The mean particle size of the carbon composite electrode material obtained at this time was approx. 25.1 μm, as determined by laser diffraction particle analyzer. However, there is a possibility that the observed particles are consisted of the mixture of those cohered each other and those not cohered, since the particles were deposited and cohered each other through the reaction.

It should be noted that the gas remaining in the reactor tube after the pyrolysis reaction was removed by exhausting through an exhaust facility 9.

With regard to the crystalline structure of the carbon composite electrode material obtained in this way, results of measurements of its X-ray diffraction and argon laser Raman spectra gave the undermentioned data:

$$d=0.3373 \text{ nm and } R=0.48$$

In this case, X-ray by CuKα line was employed for the X-ray diffraction and d represents a mean interlayer spacing. R denotes the ratio of the peak intensity at 1360 cm$^{-1}$ to that at 1580 cm$^{-1}$ of the argon laser Raman spectra.

About 30 mg of this carbon composite electrode material was mixed with 5% by weight of a polyolefin as a binder. It was then hot-pressed on a nickel mesh at about 120° C. and under about 400 kg/cm², yielding a pellet with an approx. 15 mm dia. This pellet was named test electrode A.

Comparative Example 1

Using the powder of the graphite (KS-75, mfd. by Lonza Co.) of Example 1 as the core carbon particles with high crystallinity, the carbon composite electrode material was prepared under the similar conditions, except that they were not coated with the nickel film. When the measurements were taken of the characteristics of the crystal structure obtained in this way under the similar conditions as in Example 1, the results gave the undermentioned data:

$$d=0.3360 \text{ and } R=0.15$$

The aforementioned interlayer spacing was found to be nearly equal to that of graphite, attesting to the fact that under such conditions as in Example 1, noncrystalline carbon material is hardly formed on the graphite surface.

Measurement results of the specific surface area by the BET method suggested that the carbon composite electrode material of Example 1 has 12 times as large a specific surface area as that of the carbon composite electrode material of Comparative Example 1.

Further, from about 30 mg of this carbon composite electrode material, a pellet with an approx. 15 mm dia. was obtained by the similar method as in Example 1. This pellet was named comparative electrode.

Example 2

A powder of the graphite (KS-75, mfd. by Lonza Co.) of Example 1 used as the core carbon particles with high crystallinity was coated with cobalt by electroless cobalt plating process. The powder was dipped in a cobalt plating bath, after subjecting it to the pretreatment and the activation treatment under the similar conditions as in Example 1. The plating bath was prepared by mixing 0.13 mol/l of $COCl_3 \cdot 6H_2O$ and 0.05 mol/l of sodium hypophosphite and with this bath, the cobalt was plated on the powder at a temperature of 80° C. The plated cobalt film thickness, as measured by the similar method as in Example 1, was approx. 0.51 μm.

The carbon material was formed, deposited and/or covered, to prepare the carbon composite electrode material, similarly as in Example 1, except using the graphite coated with the cobalt film obtained in this way. The mean particle size of the carbon composite electrode material at this time was found to be about 28.3 μm, as determined by laser diffraction particle analyzer. The results of the measurements on the characteristics of this crystal structure, as taken under the similar conditions as in Example 1, gave the undermentioned data $$d=0.3375 \text{ and } R=0.51$$

Further a pellet with an approx. 15 mm dia. was obtained from about 30 mg of this carbon composite electrode material by the similar method as in Example 1. This pellet was named test electrode B.

Example 3

A powder of the graphite (KS-75, mfd. by Lonza Co.) of Example 1 used as the core carbon particles with high crystallinity was coated with nickel-iron alloy by electroless nickel-iron plating process. The powder was dipped in a nickel-iron alloy plating bath, after subjecting it to the pretreatment and the activation treatment under the similar conditions as in Example 1. The plating bath was prepared by mixing 0.05 mol/l of $NiSO_4 \cdot 6H_2O$, 0.05 mol/l of ammonium iron (II) sulfate, 0.16 mol/l of sodium citrate and 0.5 mol/l of ammonium sulfate and with this bath, the powder was plated with nickel-iron at about 90° C. The plated film thickness, as measured by the similar method as in Example 1, was found to be approx. 0.80 μm. The mean particle size of the carbon composite electrode material at this time was found to be about 31.2 μm, as determined by observation by laser diffraction particle analyzer.

The carbon material was formed and deposited, to prepare the carbon composite electrode material, similarly as in Example 1, except using the graphite coated with the nickel-iron alloy film obtained in this way. The results of the measurements on the characteristics of this crystal structure, as taken under the similar conditions as in Example 1, gave the undermentioned data:

$$d=0.3386 \text{ and } R=0.49$$

Further a pellet with an approx. 15 mm dia. was obtained from about 30 mg of this carbon composite electrode material by the similar method as in Example 1. This pellet was named test electrode C.

Example 4

A powder of the graphite (KS-75, mfd. by Lonza Co.) of Example 1 used as the core carbon particles with high crystallinity was coated with nickel by the nonelectrolytic nickel plating process similarly as in Example 1.

The formation and deposition of the carbon material was made through pyrolysis of a hydrocarbon by the similar procedure as in Example 1, using the carbon pyrolysis and depositing apparatus shown in FIG. 1. At this time, in place of propane, benzene was used as the raw material hydrocarbon. The conditions of the pyrolysis were: The current velocity of the gases 25.5 cm/min, its feed rate 0.15 mol/hr, the reaction temperature approx. 650° C. and the reaction time approx. 30 min. The mean particle size of the carbon conposite electrode material at this time was found to be abot 29.3 μm, as determined by laser diffraction particle analyzer.

The results of the measurements on the characteristics of the crystal structure of this carbon composite electrode material, as taken under the similar conditions as in Example 1, gave the undermentioned data:

$$d=0.3385 \text{ and } R=0.43$$

Further, a pellet with an approx. 15 mm dia. was obtained from about 30 mg of this carbon composite electrode material by the similar method as in Example 1. This pellet was named test electrode D.

Example 5

A powder of the graphite (KS-75, mfd. by Lonza Co.) of Example 1 used as the core carbon particles with high crystallinity was coated with nickel by the electroless nickel plating process similarly as in Example 1.

The formation and deposition of the carbon material was made through pyrolysis of a hydrocarbon by the similar procedure as in Example 1, using the carbon pyrolysis and depositing apparatus shown in FIG. 1. At this time, in place of propane, 2-dichloroethylene was used as the raw material hydrocarbon. The conditions of the pyrolysis were: The flow rate of the gases 18.5 cm/min, its feed rate 0.12 mol/hr, the reaction temperature approx. 650° C. and the reaction time approx. 30 min. The mean particle size of the carbon conposite electrode material at this time was found to be about 34.5 μm, as determined by laser diffraction particle analyzer.

The results of the measurements on the characteristics of the crystal structure of this carbon composite electrode material, as taken under the similar conditions as in Example 1, gave the undermentioned data:

$d=0.3412$ and $R=0.55$

Further, a pellet with an approx. 15 mm dia. was obtained from about 30 mg of this carbon composite electrode material by the similar method as in Example 1. This pellet was named test electrode E.

Example 6

About 5 g of a powder of natural graphite (produced in Madagascar, its mean particle size 6.2 μm, $d=0.3363$ nm, no peak at 1360 cm$^{-1}$ in the argon laser Raman spectra observed) used as the core carbon particles with high crystallinity was coated with nickel by the electroless nickel plating process. The pretreatment and the activation treatment for forming the nickel film were similarly performed as in Example 1 and then the powder was submitted to the plating process. A nickel film was formed in the plating bath of a mixture of 30 g/l of NiSO$_4$·6H$_2$O, 10 g/l of sodium acetate and 10 g/l of sodium hypophosphite at about 90° C. From the weight of the graphite thus coated, the mean film thickness of the nickel film was calculated to be 0.70 μm.

Similarly as in Example 1, a carbon composite electrode material was prepared by forming and depositing a carbon material on the plated particles. The mean particle size of the carbon composite electrode material at this time was approx. 14.1 μm, as determined by laser diffraction particle analyzer. The results of the measurements on the characteristics of the crystal structure, as taken under the similar conditions as in Example 1, gave the undermentioned data:

$D=0.3378$ and $R=0.51$

Further, a pellet with an approx. 15 mm dia. was obtained from about 30 mg of this carbon composite electrode material by the similar method as in Example 1. This pellet was named test electrode F.

Example 7

About 5 g of mesophase spherules carbonized and further heat-treated at 2800° C. (their mean particle size 5.8 μm, $d=0.3358$ nm and $R=0.35$) used as the core carbon particles with high crystallinity were coated with nickel by the electroless nickel plating process. Their pretreatment and activation treatment for forming the nickel film were similarly performed as in Example 1 and then the spherules were submitted to the plating process. A nickel film was formed in the plating bath of a mixture of 30 g/l of NiSO$_4$·6H$_2$O, 50 g/l of ammonium chloride with 10 g/l of sodium hypophosphite at about 90° C. From the weight of the graphite thus coated, the mean film thickness of the nickel film was calculated to be 0.84 μm.

Similarly as in Example 1, a carbon composite electrode material was prepared by forming, depositing and/or covering a carbon material on the plated spherules. The mean particle size of the carbon composite electrode material at this time was approx. 12.6 μm, as determined by laser diffraction particle analyzer. The results of the measurements on the characteristics of the crystal structure, as taken under the similar conditions as in Example 1, gave the undermentioned data:

$d=0.3397$ and $R=0.62$

Further, a pellet with an approx. 15 mm dia. was obtained from about 30 mg of this carbon composite electrode material by the similar method as in Example 1. This pellet was named test electrode G.

Example 8

A carbon composite electrode material was prepared similarly as in Example 7, except that mesophase spherules which had been carbonized and further heat-treated at 2000° C. (their mean particle size 16.4 μm, $d=0.3385$ nm, $R=0.39$) were used as the core carbon particles with high crystallinity. The mean thickness of the nickel film at this time was found to be 1.72 μm and the mean particle size of the carbon composite electrode material was 25.3 μm. The results of the measurements on the characteristics of the crystal structure, as taken under the similar conditions as in Example 1, gave the undermentioned data:

$d=0.3410$ and $R=0.53$

Further, a pellet with an approx. 15 mm dia. was obtained from about 30 mg of this carbon composite electrode material by the similar method as in Example 1. This pellet was named test electrode H.

Figure 2:
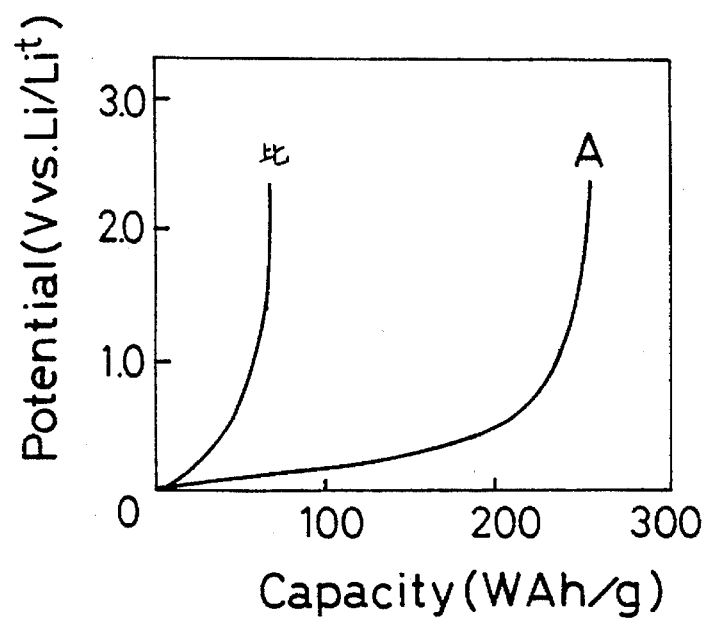
FIG. 2 is a diagrammatic representation of discharging curves for the test electrode A in an embodiment and a comparative electrode.
Figure 3:
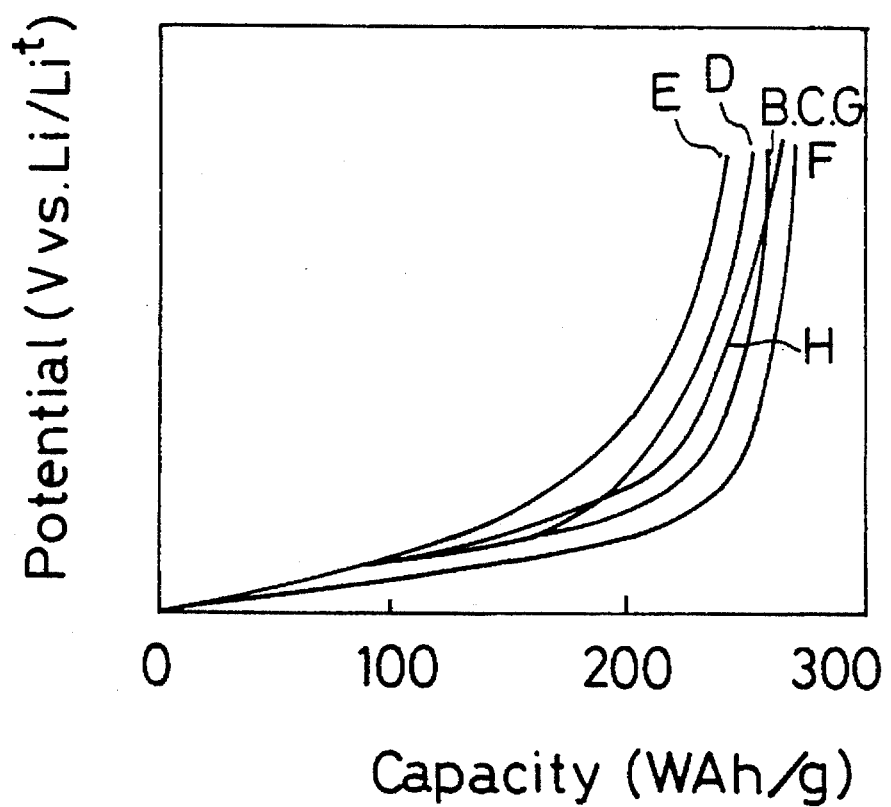
FIG. 3 is a diagrammatic representation of discharging curves for other test electrodes B, C, D, E, F, G and H in embodiments of this invention.

With the test electrodes A through H and the comparative electrode above mentioned, charge-discharge tests were carried out in the range of 0–2.5 V. As the working electrode, the test electrodes and the comparative electrode were used and as the counter electrode and the reference electrode, lithium metal was used. As the electrolyte, propylene carbonate having 1 mol/l of LiClO$_4$ dissolved therein was used. The charge-discharge test was carried out in a globe box in an argon atmosphere. The discharge curves obtained at that time were depicted in FIGS. 2 and 3. These graphs indicate that, as compared with the comparative electrode, all of the test electrodes A through H gave higher discharge capacity.

According to this invention, a carbon material having an inside layer with high crystallinity and an outside layer with turbulent crystal structure could be relatively manufactured at a low temperature and in a short time. In cells using the carbon composite electrode material obtained by this manufacturing method as their negative electrode active substance, the charge-discharge capacity and rate was remarkably improved because of larger surface area of the electrode.

What is claimed is:

1. A method for manufacturing a carbon composite electrode comprising a plurality of carbon particles, each particle having a crystalline carbon core wherein the crystalline carbon particle core is natural graphite, kish graphite, or graphitizing carbons obtained by heat treating at a temperature above about 2000° C., wherein a plurality of carbon particles are formed into a carbon composite electrode, the method comprising:

coating the surface of each crystalline carbon particle core with a film containing an element of Group VIII metal or an alloy thereof to obtain metal coated carbon particles, depositing a carbon material on the surface of the resulting metal coated carbon particles by pyrolyzing a hydrocarbon, the carbon material having a degree of crystallinity lower than that of the crystalline carbon core, thereby providing a composite carbon particle, and forming the carbon composite electrode from a plurality of the composite carbon particles.

2. A method as claim in claim 1, wherein the crystalline carbon core has a ratio of the peak intensity at 1360 cm$^{-1}$ to that at 1580 cm$^{-1}$ in its argon laser Raman scattering spectra, which ratio is lower than 0.4.

3. A method as claimed in claim 1, wherein the crystalline carbon core has an interlayer distance d(002) in the c-axis direction of from 0.335 to 0.340 nm.

4. A method as claimed in claim 1, wherein the carbon material deposited on the surface of the metal coated carbon particles has a ratio of the peak intensity at 1360 cm$^{-1}$ to that at 1580 cm$^{-1}$ in its argon laser Raman scattering spectra, which ratio is 0.4 or more.

5. A method as claimed in claim 1, wherein the carbon material deposited on the film of metal has an interlayer distance d(002) in the c-axis direction of from 0.337 or more, the interlayer distance being greater than that of the crystalline carbon core.

6. A method as claimed in claim 1, wherein the carbon material is formed on the metal coated carbon particles by pyrolysis in vapor phase.

7. A method as claimed in claim 1, wherein the metal of Group VIII is iron, cobalt, nickel or an alloy thereof.

8. A method as claimed in claim 1, wherein the thickness of the film containing the element of Group VIII metal or alloy thereof is from 0.1 to 2 μm.

9. A method as claimed in claim 1, further comprising forming the particulate carbon composite electrode material into an electrode for a lithium secondary battery.

10. A method as claimed in claim 2, wherein the crystalline carbon core has an interlayer distance d(002) in the c-axis direction of from 0.335 to 0.340 nm and the carbon material deposited on the surface of the metal coated carbon particles has a ratio of the peak intensity at 1360 cm$^{-1}$ to that at 1580 cm$^{-1}$ in its argon laser Raman scattering spectra, which ratio is 0.4 or more.

11. A method as claimed in claim 2, wherein the crystalline carbon core has an interlayer distance d(002) in the c-axis direction of from 0.335 to 0.340 nm and the carbon material deposited on the surface of the metal coated carbon particles has an interlayer distance d(002) in the c-axis direction (a) of from 0.337 or more and (b) that is greater than the interlayer distance of the crystalline carbon core.

12. A carbon composite electrode comprising a plurality of carbon particles useful for a non-aqueous secondary battery, each carbon particle comprising;

a crystalline carbon core formed of natural graphite, kish graphite, or graphitizing carbons obtained by heat treating at a temperature above about 2000° C.;

a metal film containing an element of Group VIII metal or an alloy thereof coating the surface of the crystalline carbon core; and a carbon layer comprising a carbon material deposited on the whole surface of the metal film by pyrolyzing a hydrocarbon, thereby providing a composite carbon particle;

wherein the carbon material in the carbon layer has a degree of crystallinity lower than that of the crystalline carbon core;

the carbon composite electrode being formed from a plurality of the composite carbon particles.

13. A carbon composite particle electrode material as claimed in claim 12, wherein the crystalline carbon core has a ratio of the peak intensity at 1360 cm$^{-1}$ to that at 1580 cm$^{-1}$ in its argon laser Raman scattering spectra, which ratio is lower than 0.4.

14. A carbon composite particle electrode material as claimed in claim 12, wherein the crystalline carbon core has an interlayer distance d(002) in the c-axis direction of from 0.335 to 0.340 nm.

15. A carbon composite particle electrode material as claimed in claim 12, wherein the carbon material deposited on the surface of the metal coated carbon particles has a ratio of the peak intensity at 1360 cm$^{-1}$ to that at 1580 cm$^{-1}$ in its argon laser Raman scattering spectra, which ratio is 0.4 or more.

16. A carbon composite particle electrode material as claimed in claim 12, wherein the carbon material deposited on the film of metal has an interlayer distance d(002) in the c-axis direction of from 0.337 or more, the interlayer distance being greater than that of the crystalline carbon core.

17. A carbon composite particle electrode material as claimed in claim 12, wherein the carbon material is formed on the metal coated carbon particles by pyrolysis in vapor phase.

18. A carbon composite particle electrode material as claimed in claim 12, wherein the metal of Group VIII is iron, cobalt, nickel or an alloy thereof.

19. A carbon composite particle electrode material as claimed in claim 12, wherein the thickness of the film containing the element of Group VIII metal or alloy thereof is from 0.1 to 2 μm.

20. A carbon composite particle electrode material as claimed in claim 12, wherein the crystalline carbon core has an interlayer distance d(002) in the c-axis direction of from 0.335 to 0.340 nm and the carbon material deposited on the surface of the metal coated carbon particles has a ratio of the peak intensity at 1360 cm$^{-1}$ to that at 1580 cm$^{-1}$ in its argon laser Raman scattering spectra, which ratio is 0.4 or more.

21. A carbon composite particle electrode material as claimed in claim 12, wherein the crystalline carbon core has an interlayer distance d(002) in the c-axis direction of from 0.335 to 0.343 nm and the carbon material deposited on the surface of the metal coated carbon particles has an interlayer distance d(002) in the c-axis direction (a) of from 0.337 or more and (b) that is greater than the interlayer distance of the crystalline carbon core.

* * * * *